May 4, 1926.
E. W. HOLSTROM
REVERSE GEAR MECHANISM
Filed July 23, 1924
1,583,714
3 Sheets-Sheet 2
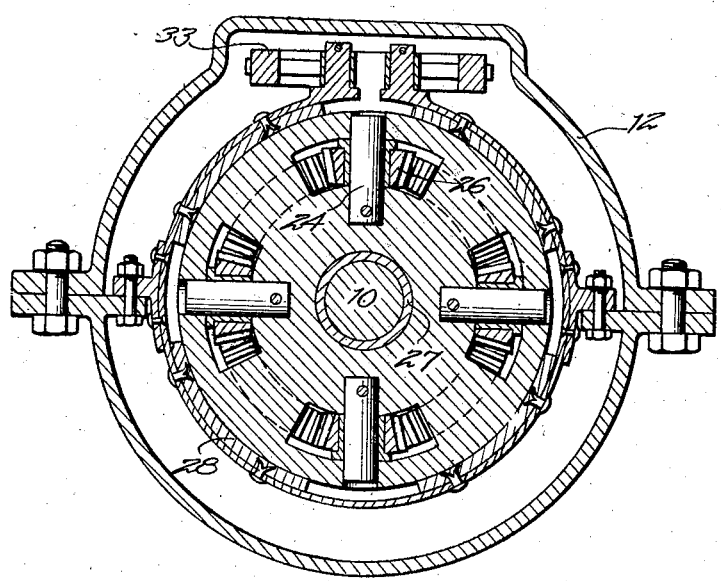
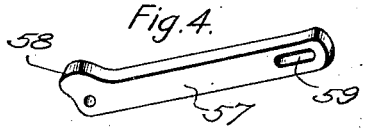
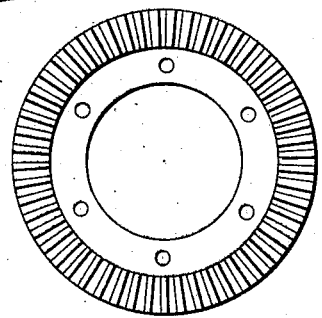
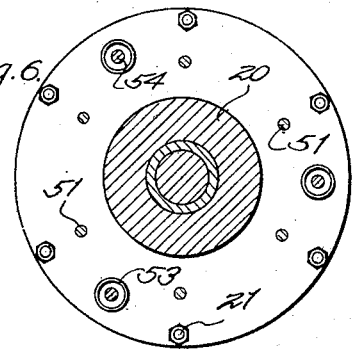
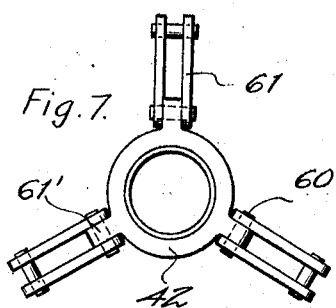
E. W. Holstrom
INVENTOR
BY Victor J. Evans
ATTORNEY
WITNESS:

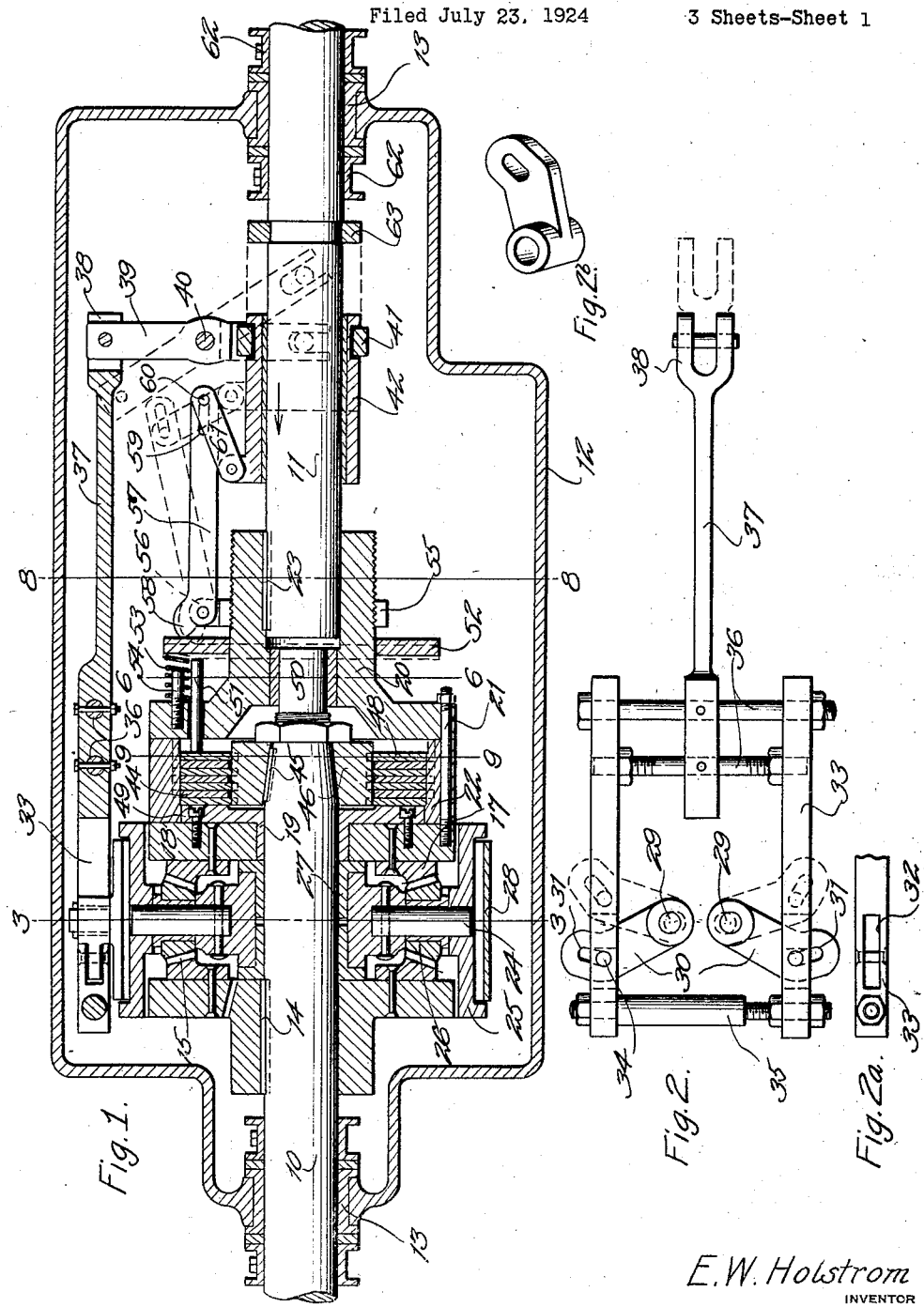

May 4, 1926.
E. W. HOLSTROM
1,583,714
REVERSE GEAR MECHANISM
Filed July 23, 1924
3 Sheets-Sheet 3
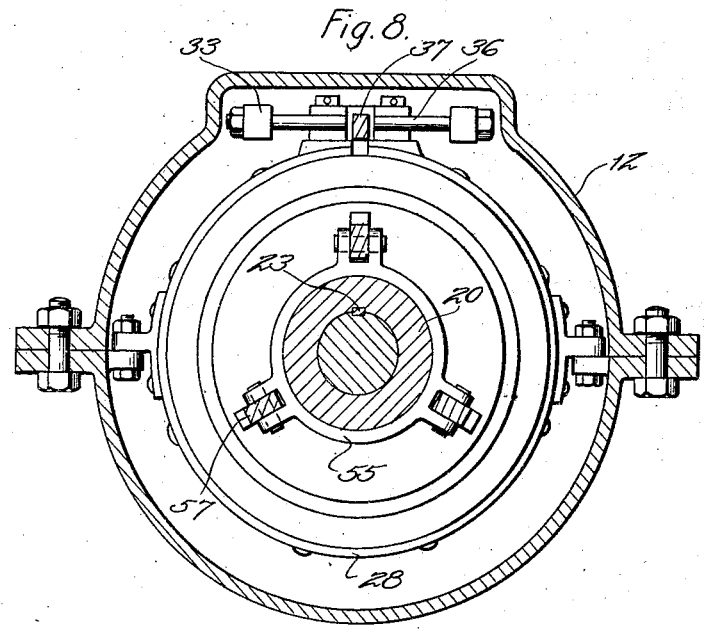
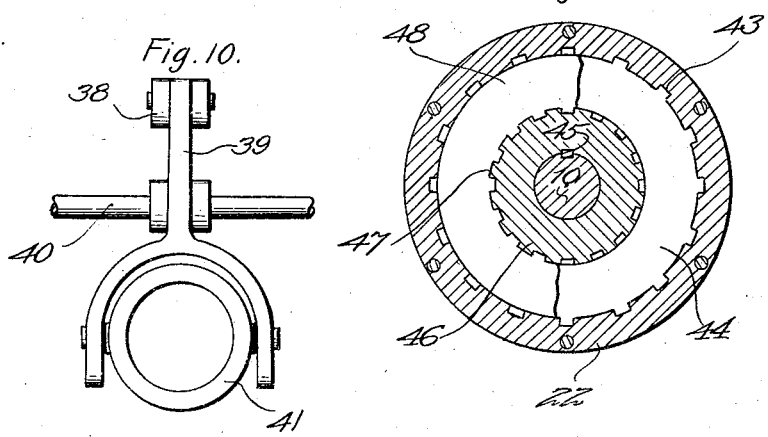

Patented May 4, 1926.

1,583,714

UNITED STATES PATENT OFFICE.

ELMER W. HOLSTROM, OF LAKE CITY, MINNESOTA.

REVERSE-GEAR MECHANISM.

Application filed July 23, 1924. Serial No. 727,788.

*To all whom it may concern:*

Be it known that I, ELMER W. HOLSTROM, a citizen of the United States, residing at Lake City, in the county of Wabasha and State of Minnesota, have invented new and useful Improvements in Reverse-Gear Mechanism, of which the following is a specification.

This invention relates to transmission mechanism and has for an object the provision of means for operating a driven shaft from a drive shaft, the main object of this invention being to obtain the same number R. P. M. of the driven shaft when rotating in either direction, as that of the drive shaft.

More specifically stated, the invention aims to provide means for connecting a drive shaft and a driven shaft whereby the latter may be rotated in the direction of rotation of the drive shaft, or in a direction reverse thereto, means being provided for controlling the drive and driven shaft connecting means whereby the direct drive connection between the shafts will be released when the reverse driving connection is engaged and vice versa.

Another object of the invention is the provision of simple and reliable means whereby rotation of the driven shaft may be controlled.

With the above and other objects in view, the invention further includes the following novel features and details of construction, to be hereinafter more fully described, illustrated in the accompanying drawings and pointed out in the appended claims.

In the drawings:—

Figure 1 is a sectional view through a transmission mechanism constructed in accordance with the invention, the active position of the direct driving means being shown by dotted lines.

Figure 2 is a fragmentary top plan view of the means for controlling the operation of the reversing gears, the active position of the controlling means being shown by dotted lines.

Figure 2ª is a fragmentary edge view of a portion of the mechanism shown in Figure 2.

Figure 2ᵇ is a detail perspective view of one of the brake band operating levers.

Figure 3 is a section on the line 3—3 of Figure 1.

Figure 4 is a detail perspective view of one of the clutch operating levers.

Figure 5 is a sectional view showing one of the ring gears.

Figure 6 is a section on the line 6—6 of Figure 1.

Figure 7 is a detail end elevation of the sliding collar and its connection with the clutch operating levers.

Figure 8 is a section on the line 8—8 of Figure 1.

Figure 9 is a similar view on the line 9—9 of Figure 1.

Figure 10 is an end elevation of the clutch collar looking at the end opposite to that shown in Figure 7 and illustrating the connection of the clutch collar with the reverse rod.

Referring to the drawings in detail wherein like characters of reference denote corresponding parts, the reference character 10 indicates a drive shaft and 11 a driven shaft. The drive shaft may be operated by any suitable power and may for example be the drive shaft of an automobile engine, while 11 may represent the shaft which connects the engine drive shaft with the usual automobile differential.

The mechanism which transmits power from the drive to the driven shaft and which constitutes the subject matter of the present invention is preferably enclosed within a housing 12 and the latter is provided at opposite ends with suitable bearings 13 for the accommodation of the drive and driven shafts.

Keyed to the drive shaft 10 as indicated at 13 is the hub of a ring gear 15 which may be of any suitable construction. Loosely mounted upon the shaft 10 is a ring gear 17 which is carried by a plate or collar 18. This plate or collar 18 has secured thereto a bushing 19 and this plate or bushing is secured to a hub 20 through the medium of bolts 21, the latter passing through an annulus 22, the plate or collar 18, the bushing 19, the hub 20 and the annulus 22 are thus connected together and are rotatable as a unit. The hub 20 is keyed to the shaft 11 as shown at 23.

Mounted upon short shafts 24 in a cage 25 is a plurality of pinions 26, the latter engaging the ring gears 15 and 17. This cage is freely rotatable upon the shaft 10 and is provided with annular divided bushings 27. The outer periphery of the cage 25 is adapted to be engaged by a brake band 28 which is normally in released position and which is adapted to engage the cage so as to hold the latter against rotation and act as a holding means for the pinions 26, so that when the shaft 10 is rotated a reverse rotary movement will be provided for the shaft 11 through the ring gear 17, the annulus 22 and the hub 20.

For the purpose of controlling the operation of the brake band, the opposite ends of the latter have pivotally secured thereto as shown at 29, arms 30. The outer ends of these arms are offset and are provided with slots 31. The outer ends of the arms 30 extend through slots 32 provided in spaced parallel bars 33 and are slidingly retained in said slots by means of pins 34. The bars 33 are adjustably spaced apart at one end by means of an extensible bar 35, while spaced rods 36 connect the opposite ends of the bars.

Secured to the spaced rods 36 is one end of a reverse rod 37, whose opposite bifurcated end 38 is pivotally connected to one end of a lever 39. The lever 39 is mounted upon a rock shaft 40 and its opposite bifurcated end is pivotally secured to a ring 41 having a swiveled connection with a collar 42, the latter being slidable upon the shaft 11.

As thus for described, it will be apparent that when the shaft is rocked in one direction, the parts will be moved to the dotted line positions shown in Figures 1 and 2, whereupon the brake band will be contracted and will engage the cage 25 and hold the latter against rotation so that the shaft 11 will be driven in a reverse direction from the direction of rotation of the shaft 10.

The inner periphery of the annulus 22 is provided with spaced teeth 43 and these teeth are engaged by teeth provided upon the outer periphery of disks 44. Keyed upon the shaft 10 as shown at 45 is a collar 46 and the outer periphery of this collar is provided with teeth 47. Interposed between the disks 44 are disks 48 whose inner periphery is provided with teeth which engage the teeth of the collar 46. The disks 44 and 48 are adapted to frictionally engage one another and to also engage the flange 49 of the bushing 19 and when so engaged will provide a clutch for locking the shafts 10 and 11 together so that the said shafts will rotate in the same direction. The end of the shaft 10 has a bearing within the hub 20, as indicated at 50, a suitable bushing being provided in the hub for this purpose.

Extending through the hub 20 are spaced plungers 51 whose inner ends engage one of the disks 45 and whose outer ends are engaged by a plunger plate 52 which is slidable on the hub 20. The plunger plate 52 is normally held in disengaged position by means of springs 53 which engage the plate and which are mounted upon the pins 54.

Threadedly adjustable upon the hub 20 is a collar 55, which carries radially disposed ears 56, the latter being arranged in spaced pairs and having pivotally mounted between them one end of a lever 57. One extremity of each of these levers 57 is formed to provide a bill 58 which is adapted to engage the plunger plate 52 while the other ends of these levers are longitudinally slotted as indicated at 59. Pins 60 pass through these slots 59 and these pins are carried by spaced links 61 which are pivotally secured to ears 61' which extend radially from the collar 42.

The bearings 13 are provided with thrust collars 62 at opposite ends thereof, while a stop collar 63 is secured to the shaft 11 to limit movement of the collar 42 in one direction.

As previously stated, when the rock shaft 40 is rocked in one direction, the levers 30 will be operated to cause the brake band 28 to engage the gear cage 25 and rotate the shaft 11 in a direction reverse to the direction of rotation of the shaft 10. This operation of the rock shaft 40 will slide the clutch collar 42 in the direction of the arrow shown in Figure 1 of the drawings and the pins 60 will travel freely in the slots 59 of the levers 57 without effecting any movement of the said levers so that the clutch will remain disengaged. Movment of the rock shaft 40 in a reverse direction will release the brake band 28 and will cause the clutch collar 42 to move in a direction reverse of that indicated by the arrow in Figure 1, whereupon the links 61 will be moved radially to move the adjacent ends of the levers 57 outward and cause the bills 58 of the said levers to force the plunger plate to engage the plungers 51 and effect a frictional engagement of the disks 44 and 48 and lock the shafts 10 and 11 so that both shafts will rotate in the same direction.

The invention is susceptible of various changes in its form, proportions and minor details of construction, especially the change of different proportions, size and shape of ring gears and pinions to make reverse gear mechanism suitable for different conditions and the right is herein reserved to make such changes as properly fall within the scope of the appended claims.

Having described the invention what is claimed is:—

1. In a reverse gear mechanism, a drive shaft, a driven shaft, a ring gear fast upon the drive shaft, a ring gear fast with the driven shaft, floating pinions connecting the ring gears, means to hold said pinions relatively stationary, a clutch mechanism adapted to connect the drive and driven shafts, means whereby the clutch may be operated to provide a direct drive between the shafts, a rock shaft, a lever fast upon the rock shaft and engaging the clutch collar, means connecting the lever and floating pinion holding means, whereby operation of the rock shaft in one direction will move the pinion holding means to an active position and slide the collar in one direction, an axially movable plunger for engaging the clutch, a slidingly mounted plunger plate engaging the plunger and means operated by the collar and engaging the plunger plate for controlling the operation of the clutch.

2. In a reverse gear mechanism, a drive shaft, a driven shaft, a ring gear fast upon the drive shaft, a ring gear fast with the driven shaft, floating pinions connecting the ring gears, means to hold said pinions relatively stationary, a clutch mechanism adapted to connect the drive and driven shafts, means whereby the clutch may be operated to provide a direct drive between the shafts, a rock shaft, a lever fast upon the rock shaft and engaging the clutch collar, means connecting the lever and floating pinion holding means, whereby operation of the rock shaft in one direction will move the pinion holding means to an active position and slide the collar in one direction, an axially movable plunger for engaging the clutch, a slidingly mounted plunger plate engaging the plunger, pivotally mounted levers engageable with the plate for controlling the operation of the latter to control the clutch, links having their inner ends pivotally secured to the sliding collar and a slidable pivotal connection between the outer ends of the links and the pivotally mounted levers, whereby movement of the collar in one direction only will operate the levers.

3. In a reverse gear mechanism, a drive shaft, a driven shaft, a ring gear fast upon the drive shaft, a ring gear fast with the driven shaft, floating pinions connecting the ring gears, a clutch mechanism adapted to connect the drive and driven shafts, means whereby the clutch may be operated to provide a direct drive between the shafts, means including a brake band for holding the pinions in position to reverse the direction of rotation of one of the ring gears and operate the driven shaft in a direction reverse from the direction of rotation of the drive shaft, arms having their inner ends pivotally secured to the opposite ends of the brake band, a longitudinally movable member, a sliding pivotal connection between the longitudinally movable member and said arms and means common to both the longitudinally movable member and the clutch operating means, whereby either the clutch or pinion holding means may be selectively operated.

4. In a reverse gear mechanism, a drive shaft, a driven shaft, a ring gear fast upon the drive shaft, a ring gear fast with the driven shaft, floating pinions connecting the ring gears, means whereby the floating pinions may be held in position to reverse the direction of rotation of one of the ring gears and reverse the direction of rotation of the driven shaft, a clutch chamber provided in the hub of the driven shaft ring gear, a plurality of friction disks located within said chamber, every other disk having a positive rotary connection with said hub while the interposed disks have a positive rotary connection with the drive shaft, plunger rods movable through the hub and engaging the disks to lock the shafts together, a plunger plate slidable upon the hub and engaging the plunger rods, means whereby the plunger plate may be moved into active position to engage the clutch and means whereby the pinion holding means will be released when the clutch is engaged.

In testimony whereof I affix my signature.

ELMER W. HOLSTROM.